(12) United States Patent
Wu

(10) Patent No.: US 11,537,129 B2
(45) Date of Patent: Dec. 27, 2022

(54) CONTROL METHOD AND ELECTRICAL WALKER

(71) Applicant: Wistron Corporation, New Taipei (TW)

(72) Inventor: Chun-Wei Wu, New Taipei (TW)

(73) Assignee: Wistron Corporation, New Taipei (TW)

(*) Notice: Subject to any disclaimer, the term of this patent is extended or adjusted under 35 U.S.C. 154(b) by 357 days.

(21) Appl. No.: 16/776,531

(22) Filed: Jan. 30, 2020

(65) Prior Publication Data

US 2021/0149402 A1 May 20, 2021

(30) Foreign Application Priority Data

Nov. 14, 2019 (TW) .................................. 108141318

(51) Int. Cl.
*G05D 1/02* (2020.01)
*A61H 3/04* (2006.01)

(52) U.S. Cl.
CPC ............... *G05D 1/021* (2013.01); *A61H 3/04* (2013.01); *A61H 2003/043* (2013.01); *G05D 2201/0206* (2013.01)

(58) Field of Classification Search
None
See application file for complete search history.

(56) References Cited

U.S. PATENT DOCUMENTS

| 2015/0312327 A1* | 10/2015 | Fowe ...................... H04L 67/42 |
| | | 701/426 |
| 2017/0001656 A1* | 1/2017 | Katayama ................ A61H 3/04 |
| 2017/0129481 A1* | 5/2017 | Umetsu ............... B60W 30/045 |
| 2018/0164833 A1* | 6/2018 | Miller ................... B60W 40/04 |
| 2020/0352815 A1* | 11/2020 | Raja ...................... B60B 19/003 |

FOREIGN PATENT DOCUMENTS

| TW | 201038262 A1 | 11/2010 |
| WO | 2014/045955 A1 | 3/2014 |

\* cited by examiner

*Primary Examiner* — Maceeh Anwari
(74) *Attorney, Agent, or Firm* — Winston Hsu

(57) ABSTRACT

A control method for an electrical walker is provided. The control method includes measuring a plurality of slope angle values, determining a correction parameter value according to the plurality of slope angle values and generating a corrected driving force value according to the correction parameter value and an original driving force value.

8 Claims, 5 Drawing Sheets

CONTROL METHOD AND ELECTRICAL WALKER

BACKGROUND OF THE INVENTION

1. Field of the Invention

The present invention relates to a control method and an electrical walker, and more particularly, to a control method and an electrical walker capable of avoiding the influence of the external force and improving comfort during use.

2. Description of the Prior Art

A walker is one of common mobility aids. The walker can provide additional support to maintain balance or stability while a user is standing or walking, so as to ensure the safety of the user. Moreover, an electrical walker (or called power-driven walker) is usually equipped with power source to assist movement, such that the user can move without too much effort and thus especially suitable for the user whose arm or shoulder is weak or injured.

The electrical walker may provide assistance force or resistance force for the user when the user walks on an upward or downward slope. Thus, it is necessary to accurately calculate a proper assistance force value or resistance force value. In general, an accelerometer is usually used to measure slope angles. However, when the electrical walker suddenly driven by a driving force or an external force, a variation of acceleration may change too much instantaneously and thus the measured slope angle will be influenced. Moreover, the slope angle is the determination condition for electrical walker to provide assistance force or resistance force. Therefore, if the slope angle is incorrectly determined, the electrical walker will suddenly provide improper assistance force or resistance force, thereby causing discomfort and even danger to the user. In addition, the influence of the driving force or the external force may also be corrected through the three-axis data of the gyroscope. However, the gyroscope has the problem of cumulative errors. The result of cumulative angular errors over time makes the aforementioned problems cannot be effectively solved. Therefore, how to solve the above mentioned problems has become an important issue in the field.

SUMMARY OF THE INVENTION

One of the objectives of the present invention is to provide a control method and an electrical walker capable of avoiding the influence of the external force and improving comfort during use, to solve the above mentioned problems.

According to an aspect of an embodiment, a control method applied for an electrical walker is disclosed. The control method includes measuring a plurality of slope angle values; determining a correction parameter value according to the plurality of slope angle values; and generating a corrected driving force value according to the correction parameter value and an original driving force value.

According to an aspect of another embodiment, an electrical walker is disclosed. The electrical walker includes an angle measurement device, configured to measure a plurality of slope angle values; a first calculation circuit, configured to determine a correction parameter value according to the plurality of slope angle values; and a second calculation circuit, configured to generate a corrected driving force value according to the correction parameter value and an original driving force value.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
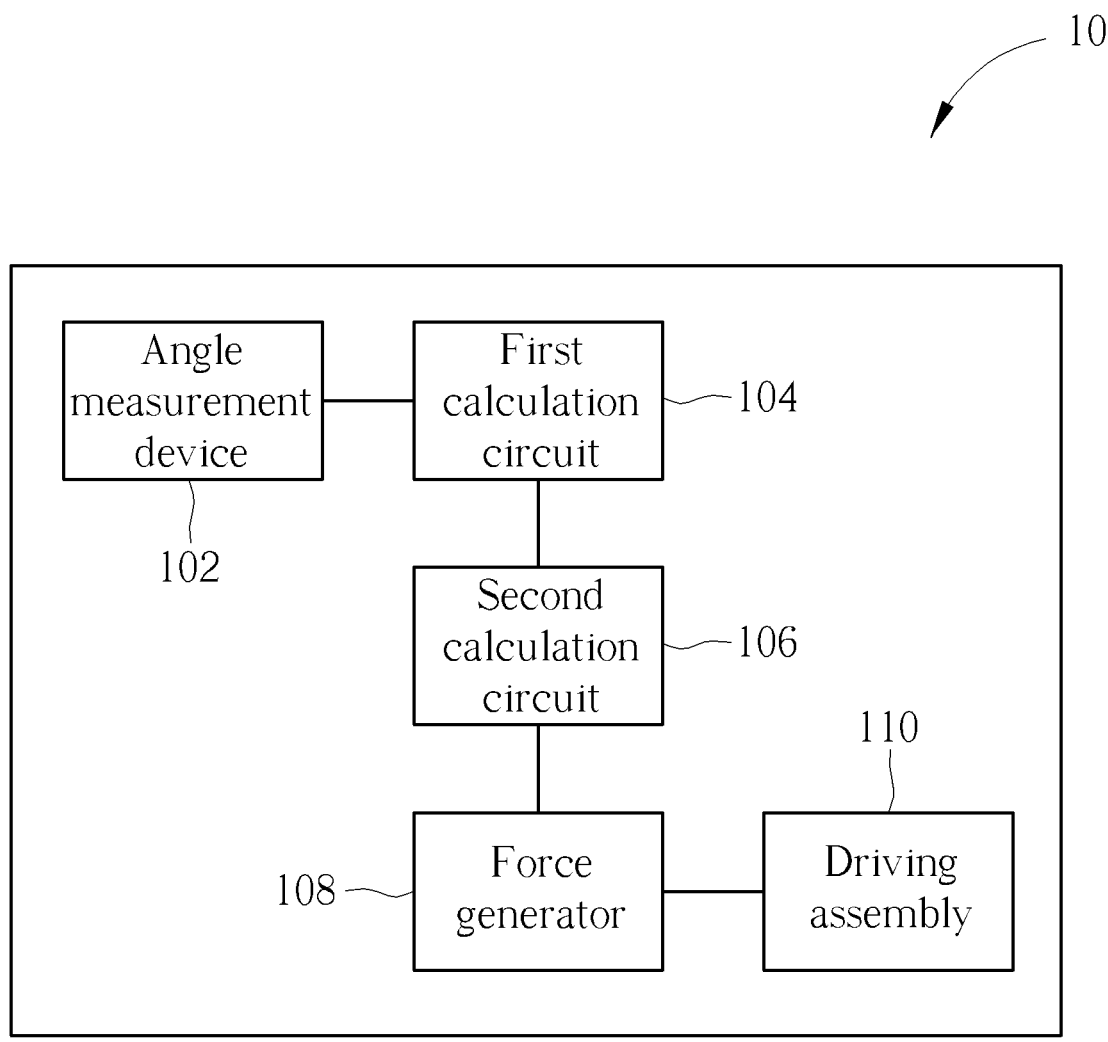
FIG. 1 is a schematic diagram illustrating an electrical walker according to an embodiment of the present invention.

Please refer to FIG. 1, which is a schematic diagram illustrating an electrical walker 10 according to an embodiment of the present invention. The electrical walker 10 includes an angle measurement device 102, a first calculation circuit 104, a second calculation circuit 106, a force generator 108 and a driving assembly 110. The angle measurement device 102 is configured to measure slope angle values. The angle measurement device 102 can be an accelerometer, but not limited thereto. The first calculation circuit 104 is configured to determine a correction parameter value according to the slope angle values. The correction parameter value may be a power of test parameter, but not limited thereto. The second calculation circuit 106 is configured to generate a corrected driving force value according to the correction parameter value calculated by the first calculation circuit 104 and an original driving force value. The force generator 108 is configured to generate force corresponding to the corrected driving force value calculated by the second calculation circuit 106 to drive the driving assembly 110 of the electrical walker 10. The force generator 108 can be a motor, but not limited thereto. The driving assembly 110 can be wheels or tracks, but not limited thereto.

Figure 2:
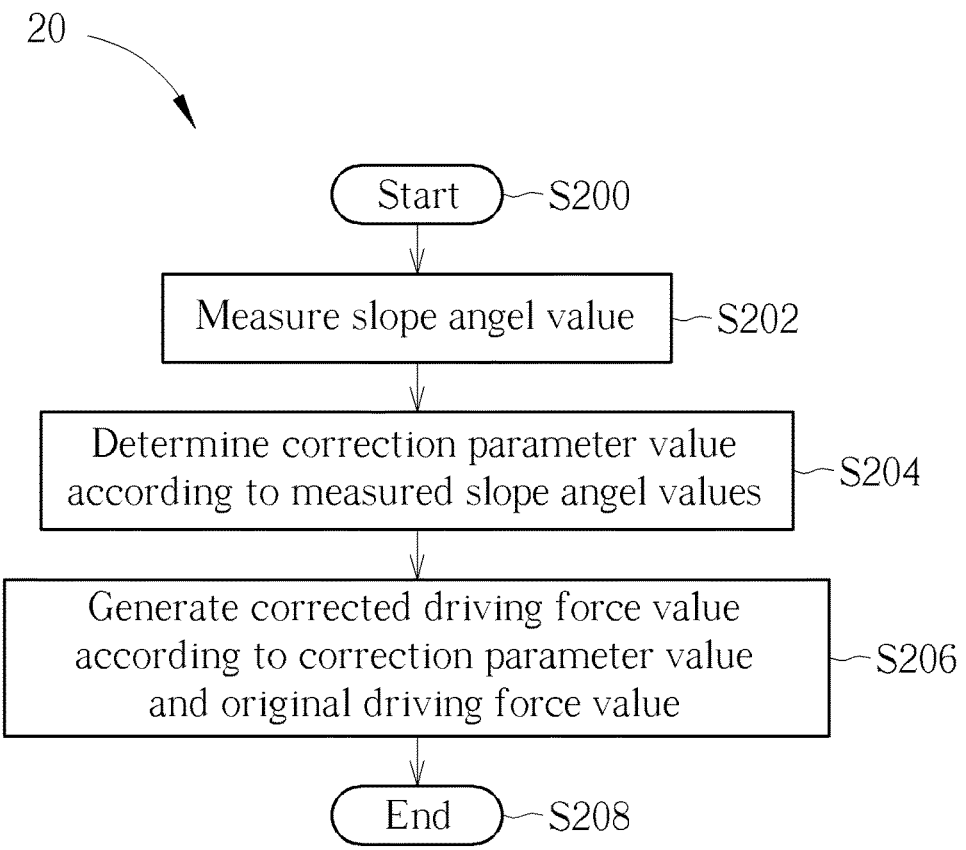
FIG. 2 is a flow diagram of a procedure according to an embodiment of the present invention.

For an illustration of the operations of the electrical walker 10, please refer to FIG. 2. FIG. 2 is a flow diagram of a procedure 20 according to an embodiment of the present invention. The flowchart in FIG. 2 mainly corresponds to the operations of the electrical walker 10 shown in FIG. 1. The procedure 20 includes the following steps:

Step S202: Measure slope angle values.

Step S204: Determine a correction parameter value according to the measured slope angle values.

Step S204: Determine a correction parameter value according to the measured slope angle values.

Step S206: Generate a corrected driving force value according to the correction parameter value and an original driving force value.

Step S208: End.

According to the procedure 20, in Step S202, during operation of the electrical walker 10, the angle measurement device 102 measures a plurality of slope angle values sequentially. For example, if the angle measurement device 102 is an accelerometer. The slope angle value may be calculated by the angle measurement device 102 according to the measured component values of x-axis, y-axis and z-axis and the following equation:

$$\theta = \arctan\left(\frac{G_y}{\sqrt{G_x^2 + G_z^2}}\right) \quad (1)$$

Where represents the slope angle value, Gx represents the measured component value of x-axis of the angle measurement device 102, Gy represents the measured component value of y-axis of the angle measurement device 102, and Gz represents the measured component value of z-axis of the angle measurement device 102.

In Step S204, the first calculation circuit 104 is configured to determine a correction parameter value according to the slope angle values measured in Step S202. The first calculation circuit 104 can calculate a first quartile Q1 of the plurality of slope angle values and a third quartile Q3 of the plurality of slope angle values and calculate an average value QA of the first quartile Q1 and the third quartile Q3. The first quartile Q1, the third quartile Q3 and the average value QA can be expressed as follows:

$$QA = \frac{(Q1 + Q3)}{2} \quad (2)$$

Further, the first calculation circuit 104 can calculate an error ratio R according to a last measured slope angle value of the plurality of slope angle values and the average value QA. The error ratio $R_\theta$ may be calculated by the first calculation circuit 104 according to the following equation:

$$R_\theta = \frac{|\theta_k - QA|}{QA} \quad (3)$$

where $R_\theta$ represents the error ratio, $\theta_k$ represents the last measured slope angle value of the plurality of slope angle values, QA represents the average value of the first quartile Q1 and the third quartile Q3.

In Step S204, the first calculation circuit 104 determines the correction parameter value Kc according to the error ratio $R_\theta$. For example, when the error ratio $R_\theta$ is greater than 1, the first calculation circuit 104 determines that the correction parameter value Kc is 0. When the error ratio $R_\theta$ is small than or equal to 1, the first calculation circuit 104 calculates a difference value between 1 and the error ratio $R_\theta$. The difference between 1 and the error ratio $R_\theta$ is determined as the correction parameter value Kc. The relationship of the error ratio $R_\theta$ and the correction parameter value Kc can be expressed as follows:

$$K_c = \begin{cases} 0, & R_\theta > 1 \\ 1 - R_\theta, & R_\theta \le 1 \end{cases} \quad (4)$$

Figure 3:
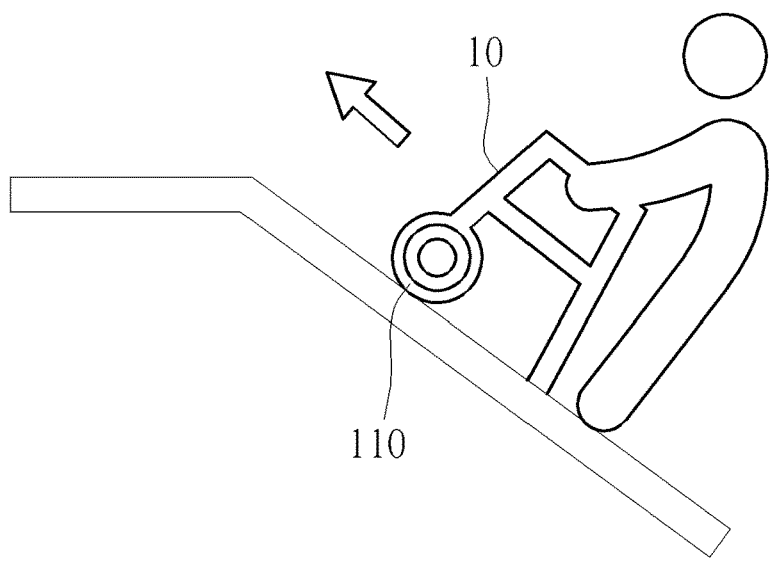
FIG. 3 is a schematic diagram of the electrical walker applied on an upward slope according to an embodiment of the present invention.
Figure 4:
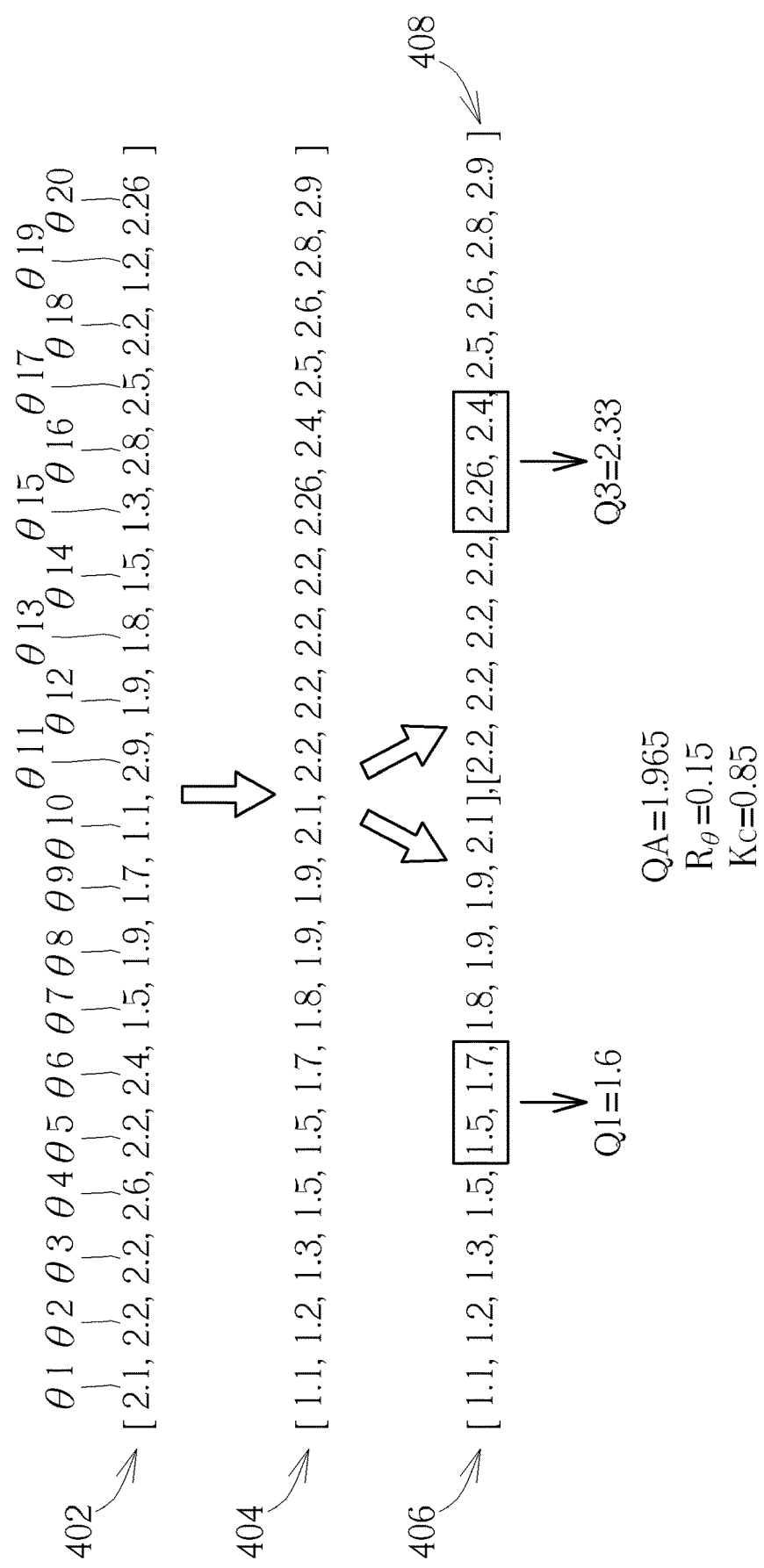
FIG. 4 to FIG. 6 are schematic diagrams illustrating the operations of determining the correction parameter value according to alternative embodiments of the present invention.

Please refer to FIG. 3 and FIG. 4. FIG. 3 is a schematic diagram of the electrical walker 10 applied on an upward slope according to an embodiment of the present invention. FIG. 4 is a schematic diagram illustrating the operations of determining the correction parameter value Kc according to an embodiment of the present invention. As shown in FIG. 3, the electrical walker 10 is applied to go uphill. In an embodiment, the angle measurement device 102 measures slope angle values θ1 to θ20. The slope angle values θ1 to θ20 (sorted by measured time) are 2.1, 2.2, 2.2, 2.6, 2.2, 2.4, 1.5, 1.9, 1.7, 1.1, 2.9, 1.9, 1.8, 1.5, 1.3, 2.8, 2.5, 2.2, 1.2, 2.26. As shown in FIG. 4, the slope angle values θ1 to θ20 can be expressed as a sequence 402. The first calculation circuit 104 sorts the sequence 402 in ascending order (i.e. from small to large) so as to generate a sequence 404. The first calculation circuit 104 divides the sequence 404 into two sequences 406 and 408. For example, if the number of slope angle values in the sequence 404 is odd, the middle value in the sequence 404 is not included in the divided sequences. If the number of slope angle values in the sequence 404 is even, the sequence 404 is divided into two sequences (i.e. sequence 406 and sequence 408 shown in FIG. 4). Further, the first calculation circuit 104 calculates a median of slope angle values in the sequence 406 to obtain the first quartile Q1. For example, if the number of slope angle values in the sequence 406 is odd, the middle value of the sequence 406 is the median of the slope angle values in the sequence 406. If the number of slope angle values in the sequence 406 is even, the average of the two middle values of the sequence 406 is the median of the slope angle values in the sequence 406. As shown in FIG. 4, the first quartile Q1 is the average of 1.5 and 1.7 (Q1=(1.5+1.7)/2=1.6). The first calculation circuit 104 calculates a median of the slope angle values in the sequence 408 to obtain the third quartile Q3. For example, as shown in FIG. 4, the third quartile Q3 is the average of 2.26 and 2.4 (Q3=(2.26+2.4)/2=2.33). The first calculation circuit 104 calculates that the average value QA is 1.965 (QA=(1.6+2.33)/2=1.965) according to the first quartile Q1, the third quartile Q3 and equation (2). The first calculation circuit 104 calculates that the error ratio $R_\theta$ is 0.15 ($R_\theta$=(2.26-1.965/1.965=0.15) according to the average value QA, the last measured slope angle value (i.e. θ20) and equation (3). The first calculation circuit 104 calculates that the correction parameter value Kc is 0.85 according to the error ratio $R_\theta$ and equation (4). In other words, embodiments of the present invention can calculate a correction parameter value Kc by using the distribution relationship of the previous measured slope angle values (e.g., θ1 to θ19) and the current measured slope angle (e.g., θ20). Since the last measured slope angle value (i.e. θ20) is slightly different from the average value QA, the calculated correction parameter value Kc is slightly smaller than 1.

Figure 5:
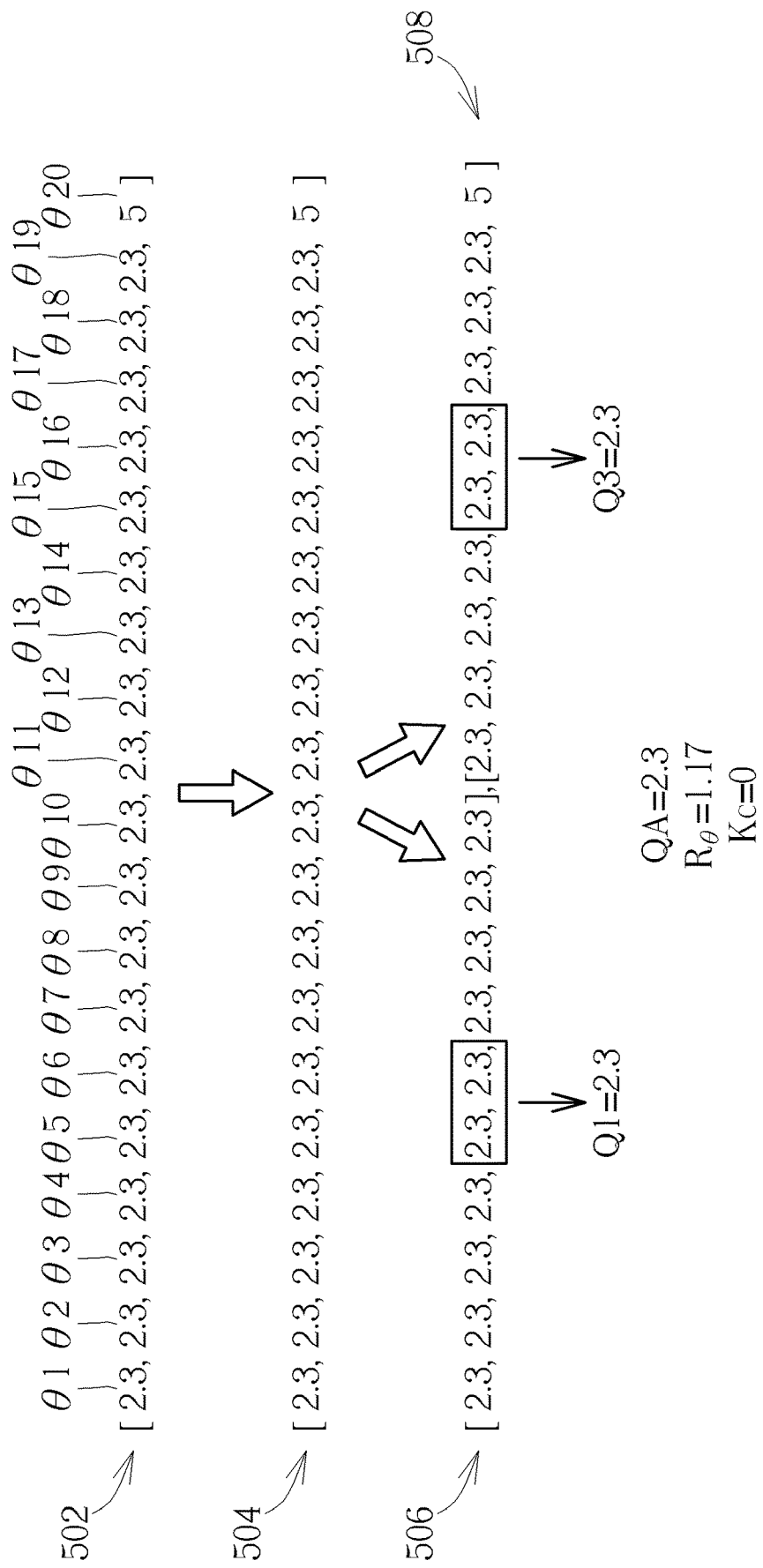

In an alternatively embodiment, as shown in FIG. 5, the angle measurement device 102 measures slope angle values θ1 to θ20. The slope angle values θ1 to θ20 can be expressed as a sequence 502. The first calculation circuit 104 sorts the sequence 502 in ascending order so as to generate a sequence 504. The first calculation circuit 104 divides the sequence 504 into sequences 506 and 508. The first calculation circuit 104 calculates that the first quartile Q1 is 2.3 (Q1=(2.3+2.3)/2=2.3) and the third quartile Q3 is 2.3 (Q3=(2.3+2.3)/2=2.3). The first calculation circuit 104 calculates that the average value QA is 2.3 (QA=(2.3+2.3)/2=2.3) according to the first quartile Q1, the third quartile Q3 and equation (2). The first calculation circuit 104 calculates that the error ratio $R_\theta$ is 1.17 ($R_\theta$=(5-2.3/2.3=1.17) according to the average value QA, the last measured slope angle value (i.e. θ20) and equation (3). The first calculation circuit 104 determines that the correction parameter value Kc is 0 according to the error ratio $R_\theta$ and equation (4). Since the driving force or external force is suddenly applied on the electrical walker 10 and the last measured slope angle value θ20 measured by the angle measurement device 102 is significantly different from the average value QA, the calculated correction parameter value Kc is 0.

Figure 6:
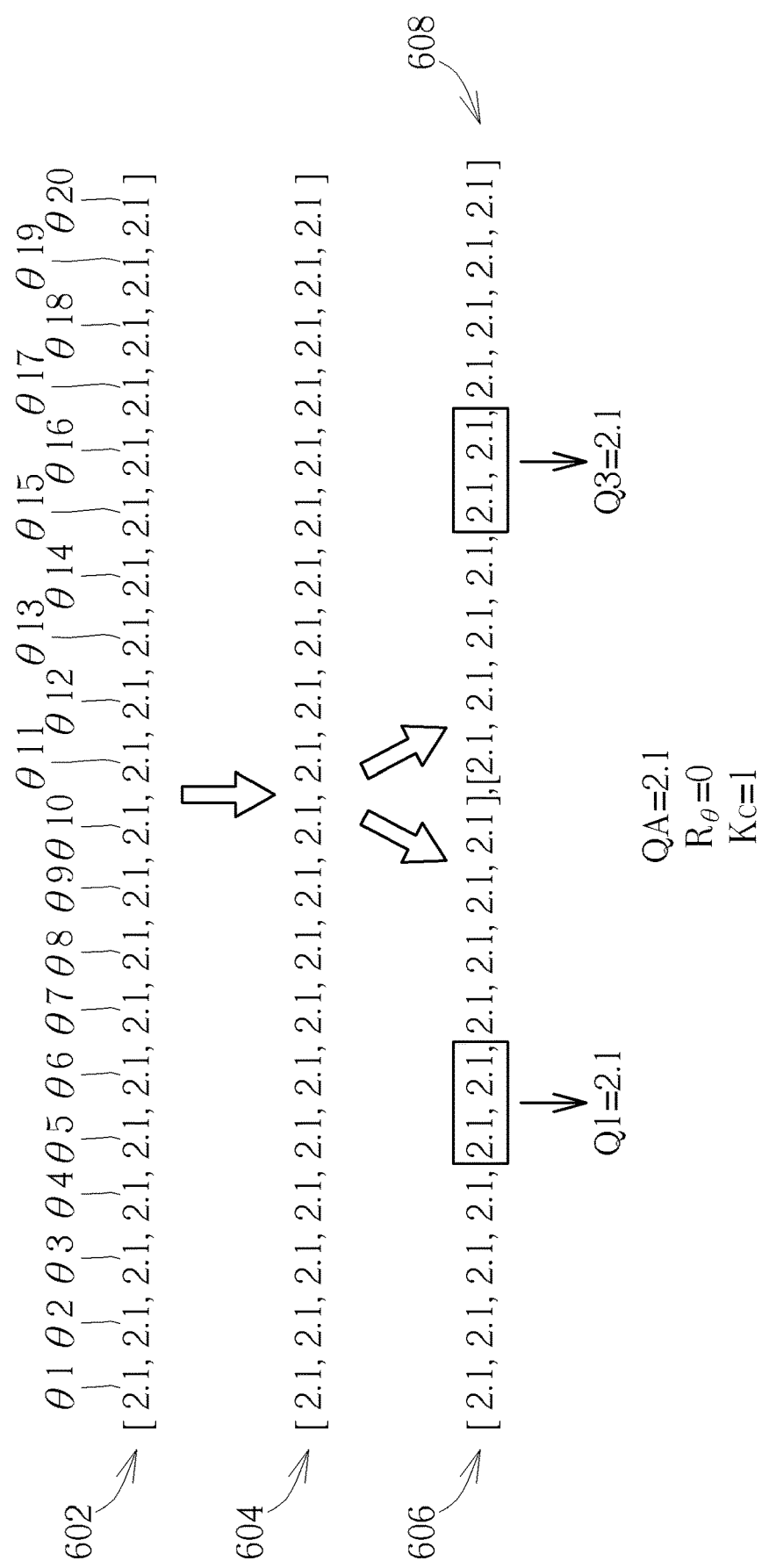

In another alternatively embodiment, as shown in FIG. 6, the angle measurement device 102 measures slope angle values 01 to 020. The slope angle values θ1 to θ20 can be expressed as a sequence 602 sorted by measured time. The first calculation circuit 104 sorts the sequence 602 in ascending order so as to generate a sequence 604. The first calculation circuit 104 divides the sequence 604 into sequences 606 and 608. The first calculation circuit 104 calculates that the first quartile Q1 is 2.1 (Q1=(2.1+2.1)/2=2.1) and the third quartile Q3 is 2.1 (Q3=(2.1+2.1)/2=2.1). The first calculation circuit 104 calculates that the average value QA is 2.1 (QA=(2.1+2.1)/2=2.1) according to the first quartile Q1, the third quartile Q3 and equation (2). The first calculation circuit 104 calculates that the error ratio $R_\theta$ is 0 ($R_\theta$=|2.1-2.1|/2.1=0) according to the average value QA, the last measured slope angle value (i.e. θ20) and equation (3). The first calculation circuit 104 calculates that the correction parameter value Kc is 1 according to the error ratio $R_\theta$ and equation (4). Since the slope angle values measured by the angle measurement device 102 are the same, the calculated correction parameter value Kc is 1.

In Step S206, the second calculation circuit 106 is configured to generate a corrected driving force value F' according to the correction parameter value Kc and an original driving force value F(θ). The original driving force value F(θ) can be preset. The original driving force value F(θ) can an assistance force or a resistance force, but not limited thereto. The original driving force value is associated with a slope angle value. For various use situations, each slope angle value has a corresponding original driving force value. For example, when the electrical walker 10 is applied on an upward slope, each slope angle value has a corresponding original driving force value for going uphill. When the electrical walker 10 is applied on a downward slope, each slope angle value has a corresponding original driving force value for going downhill. The second calculation circuit 106 generates a corrected driving force value F' according to the correction parameter value kc and an original driving force value F(θ) corresponding to the last measured slope angle value of the plurality of slope angle values. For example, the second calculation circuit 106 calculates a product of the correction parameter value kc and the original driving force value F(0) corresponding to the last measured slope angle value to generate a multiplication result and the multiplication result is determined as the corrected driving force value F'. The relationship of the corrected driving force value F', the correction parameter value Kc and the original driving force value F(θ) can be expressed as follows:

$$F'=Kc \times F(\theta) \qquad (5)$$

Moreover, the second calculation circuit 106 provides the corrected driving force value F' to the force generator 108. The force generator 108 generates the force corresponding to the corrected driving force value calculated by the second calculation circuit 106 to drive the driving assembly 110. For example, the force generator 108 may be an electrical motor and the driving assembly 110 may be wheels. The force generator 108 generates a corresponding force according to the corrected driving force value F' to drive the driving assembly 110 so as to make the electric walker 10 move, reduce movement speed or increase movement speed.

Please further refer to FIG. 4. When an external force or driving force is suddenly applied to the electrical walker 10 that causes it to move, the slope angle value measured by the angle measurement device 102 may change. Under such a situation, although the original driving force value F (θ) of the corresponding slope angle increases due to the change of the measured slope angle value measured by the angle measurement device 102, the corrected driving force value F' is pulled down by the smaller correction parameter value Kc to maintain close to the original driving force value, thus allowing a smooth and stable operations of the electrical walker 10. As a result, the user will not feel the suddenly thrust/resistance force due to the influence of the suddenly external force. Please further refer to FIG. 5. When an external force or driving force is suddenly applied to the electrical walker 10 and the slope angle value measured by the angle measurement device 102 may change. Since the measured slope angle value measured by the angle measurement device 102 suddenly increases (e.g., the last measured slope angle value θ20 is significantly different from the average value), the calculated correction parameter value Kc is 0 and thus avoiding making the user feel uncomfortable. Please further refer to FIG. 6. Since the slope angle values measured by the angle measurement device 102 are substantially the same, this means no external or driving force is applied. The calculated correction parameter value Kc is 1. The corrected driving force value is equal to the original driving force value.

Above mentioned embodiments are exemplary embodiments of the present invention, those skilled in the art should readily make combinations, modifications and/or alterations on the abovementioned description and examples. For example, the angle measurement device 102, the first calculation circuit 104, the second calculation circuit 106, the force generator 108 and the driving assembly 110 can be disposed on a body of the electrical walker 10. For example, the first calculation circuit 104 and the second calculation circuit 106 can also be disposed on other device. The slope angle values measured by the angle measurement device 102 can be transmitted to the first calculation circuit 104 through wireless or wired connections. The corrected driving force value F' calculated by the second calculation circuit 106 can be transmitted to the force generator 108 through wireless or wired connections. In addition, the abovementioned steps of the procedure including suggested steps can be realized by means that could be hardware, firmware known as a combination of a hardware device and computer instructions and data that reside as read-only software on the hardware device, an electronic system, the above mentioned electrical walker or any combination thereof. Any of the abovementioned procedures and examples above may be compiled into program codes or instructions that are stored in a storage device. The first calculation circuit 104 and the second calculation circuit 106 may read and execute the program codes or the instructions stored in the storage device for realizing the abovementioned functions.

In summary, the embodiments of the present invention can calculate a corresponding correction parameter value by using the previous measured slope angle values and the current measured slope angle value and calculate a corresponding corrected driving force value according to the calculated correction parameter value and an original driving force value corresponding to the current measured slope angle value, thus allowing the electrical walker can be driven to move smoothly and stability without being affected by suddenly applied external force or driving force and further improving comfort during use. Moreover, the embodiments of the present invention do not need to use a gyroscope to measure the slope angle and thus avoiding the problem of cumulative errors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method, applied for an electrical walker, comprising:
    measuring a plurality of slope angle values;
    calculating a first quartile and a third quartile of the plurality of slope angle values according to the plurality of slope angle values and calculating an average value of the first quartile and the third quartile;
    calculating a difference value between a last measured slope angle value of the plurality of slope angle values and the average value of the first quartile and the third quartile, and dividing an absolute value of the calculated difference value by the average value of the first quartile and the third quartile to generate an error ratio;
    determining a correction parameter value according to the error ratio; and
    generating a corrected driving force value according to the correction parameter value and an original driving force value.

2. The control method of claim 1, wherein the step of determining the correction parameter value according to the error ratio comprising:
    when the error ratio is greater than one, determining that the correction parameter value is zero; and
    when the error ratio is smaller than or equal to one, determining that the correction parameter value is a difference value between one and the error ratio.

3. The control method of claim 1, wherein the step of generating the corrected driving force value according to the correction parameter value and the original driving force value comprising:
    calculating a product of the correction parameter value and the original driving force value to generate the corrected driving force value.

4. The control method of claim 3, wherein the original driving force value is associated with the last measured slope angle value of the plurality of slope angle values.

5. An electrical walker, comprising:
    an angle measurement circuit, configured to measure a plurality of slope angle values;
    a first calculation circuit, coupled to the angle measurement circuit and configured to calculate a first quartile and a third quartile of the plurality of slope angle values according to the plurality of slope values, calculate an average value of the first quartile and the third quartile, calculate a difference value between a last measured slope angle value of the plurality of slope angle values and the average value of the first quartile and the third quartile, divide an absolute value of the calculated difference value by the average value of the first quartile and the third quartile to generate an error ratio, and determine the correction parameter value according to the error ratio; and
    a second calculation circuit, coupled to the first calculation circuit and configured to generate a corrected driving force value according to the correction parameter value and an original driving force value.

6. The electrical walker of claim 5, wherein when the error ratio is greater than one, the first calculation circuit is configured to determine that the correction parameter value is zero, and when the error ratio is smaller than or equal to one, the first calculation circuit is configured to calculate a difference value between one and the error ratio for acting as the correction parameter value.

7. The electrical walker of claim 5, wherein the second calculation circuit is configured to calculate a product of the correction parameter value and the original driving force value to generate the corrected driving force value.

8. The electrical walker of claim 7, wherein the original driving force value is associated with the last measured slope angle value of the plurality of slope angle values.

* * * * *